(12) United States Patent
Tanaka et al.

(10) Patent No.: US 7,316,208 B2
(45) Date of Patent: Jan. 8, 2008

(54) GENERATOR COOLING SYSTEM OF ENGINE

(75) Inventors: Ichiro Tanaka, Kakogawa (JP); Yoshiharu Matsuda, Akashi (JP); Yuji Hida, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 11/519,801

(22) Filed: Sep. 13, 2006

(65) Prior Publication Data

US 2007/0062467 A1    Mar. 22, 2007

(30) Foreign Application Priority Data

Sep. 14, 2005  (JP)  ............................ P2005-267107

(51) Int. Cl.
*F01P 1/06* (2006.01)
*F01P 3/00* (2006.01)
*H02K 7/18* (2006.01)

(52) U.S. Cl. ............................... 123/41.31; 123/41.42; 290/1 R

(58) Field of Classification Search ............. 123/41.31, 123/41.42, 196 AB, 196 A, 196 R; 290/1 R
See application file for complete search history.

(56) References Cited

U.S. PATENT DOCUMENTS 5,199,395 A * 4/1993 Mizumura et al. ..... 123/196 AB
6,725,823 B2 * 4/2004 Hori et al. ............... 123/196 R
7,093,569 B2 * 8/2006 Nakatsuka et al. ...... 123/41.44

FOREIGN PATENT DOCUMENTS

JP    2898257    3/1999

* cited by examiner

*Primary Examiner*—Stephen K. Cronin
*Assistant Examiner*—Hyder Ali
(74) *Attorney, Agent, or Firm*—Wenderoth, Lind & Ponack, L.L.P.

(57) ABSTRACT

The present invention provides a generator cooling system of an engine which can supply sufficient cooling oil to a generator even during low speed operation, without complicating an oil passage formed within a wall of a crankcase. In the generator cooling system of the engine having a generator accommodated in a generator room which is formed at an end portion of the crankcase in a longitudinal direction of a crankshaft of the engine, the generator cooling system is provided with an oil passage formed to the crankcase in a position lower than an axis of the crankshaft, and an oil nozzle provided in the oil passage for injecting oil of the oil passage toward a lower portion within the generator room.

9 Claims, 5 Drawing Sheets

Fig. 6 – PRIOR ART

GENERATOR COOLING SYSTEM OF ENGINE

BACKGROUND OF THE INVENTION

1. Field of the Invention

The present invention relates to a generator cooling system of an engine forcibly cooling a generator with oil.

2. Prior Art

A generator of an engine is generally structured by arranging a rotor and a stator coil in a generator room, and is generally structured such as to be cooled for preventing a power generation efficiency from being lowered, because the generator generates heat during operation of the engine. As cooling systems, there are an air cooling type and a fluid cooling type. However, the fluid cooling type utilizing oil provides a better cooling effect. Particularly, in the case that a rotor is directly coupled to a crankshaft of the engine and the generator room is sealed by a generator cover, there is employed a forcible cooling structure using oil.

As a conventional oil type generator cooling system, there is a system described in Japanese Patent No. 2898257. FIG. 6 shows a generator cooling system described in the publication mentioned above, in which a generator room 104 is formed by fastening a generator cover 102 to a side wall in an axial length direction of a crankshaft 103 of a crankcase 101, and a generator is accommodated in the generator room 104. The generator is constituted by a rotor 106 fixed to an end portion of the crankshaft 103, and a stator coil 110 fixed to an inner surface of the generator cover 102. An oil nozzle 111 for cooling the generator is formed at an end portion of an oil passage 112 formed within a wall of the crankcase 101, and is arranged at position higher than an axis O1 of the crankshaft 103 and at approximately an upper end position of the generator room 104.

In accordance with the structure in FIG. 6, the oil injected into an upper end portion of the generator room 104 from the oil nozzle 111 goes around an outer portion in a radial direction of an outer peripheral wall 106c of the rotor 106 on the basis of a rotation of the rotor 106, and is sequentially scattered to the stator coil 110 in the middle of going around.

PROBLEMS TO BE SOLVED BY THE INVENTION

In FIG. 6, a main gallery of the oil of the engine is generally formed below the crankshaft 103, and the structure is such that the oil is supplied to a bearing metal of the crankshaft 103 from the main gallery. However, if the oil nozzle 111 is formed in the upper end portion of the generator room 104 above the crankshaft 103, it is necessary to push up the oil from the main gallery to the bearing metal of the crankshaft 103, and it is necessary to push up the oil from the crankshaft 103 to the oil nozzle 111 via the oil passage 112. Accordingly, since the structure of the oil passage 112 within the wall of the crankcase 101 is complicated, and a pumping height to the oil nozzle 111 is high, a pressure of the oil in the oil nozzle 111 is lowered. In particular, during low speed operation, an injection amount of the oil for cooling the generator is reduced, thereby affecting generator cooling performance.

SUMMARY OF THE INVENTION

The present invention is made by taking the problem mentioned above into consideration, and an object of the present invention is to provide a generator cooling system of an engine which can supply a sufficient cooling oil to a generator even during low engine speed operation, without complicating an oil passage formed within a wall of a crankcase.

In order to achieve the object mentioned above, in accordance with the present invention, there is provided a generator cooling system of an engine having a generator accommodated in a generator room which is formed at an end portion of a crankcase in a longitudinal direction of a crankshaft, wherein the generator cooling system comprises: an oil passage formed to the crankcase in a position lower than an axis of the crankshaft; and an oil nozzle provided in the oil passage for injecting oil of the oil passage toward a lower portion within the generator room.

In accordance with the structure mentioned above, it is possible to directly communicate the oil nozzle open to the generator room with a main oil gallery formed in a lower portion of the crankcase, or it is possible to communicate the oil nozzle with the main oil gallery via the short oil passage, and it is possible to simplify the oil passage for cooling the generator. Further, since the oil nozzle is positioned at the position lower than the axis of the crankshaft, the pumping height (oil head) from a discharge port of an oil pump of the engine to the oil nozzle becomes low, and it is possible to sufficiently supply the oil to the generator even during low speed operation, without generating any lack of the oil.

It is preferable for the oil nozzle to be positioned in a lower end portion of the generator room.

In accordance with the structure, since the position of the oil nozzle is set at a lowest position within the range in which the oil can be supplied to the generator, it is possible to further simplify the oil passage for cooling the generator, and it is possible to make the pumping height (oil head) to the oil nozzle smallest.

It is preferable for the generator to be provided with a rotor fixed to an end portion of the crankshaft, and a stator coil arranged in an inner side of the rotor in a radial direction of the rotor and firmly attached to a generator cover covering the generator room, the oil nozzle being positioned in an outer side of the rotor in the radial direction, and a guide surface guiding the oil injected from the oil nozzle to the inner side of the rotor in the radial direction of the rotor being formed in the generator cover.

In accordance with this structure, since the oil injected from the oil nozzle is brought into contact with the guide surface of the generator cover, and is conducted to the inner side of the rotor in the radial direction by the guide surface, it is possible to efficiently cool the stator coil arranged within the rotor.

It is preferable for the crankcase to be vertically divided into an upper crankcase member and a lower crankcase member, and for the oil passage and the oil nozzle to be formed in the lower crankcase member.

In accordance with this structure, since it is not necessary to form the oil passage and the oil nozzle for cooling the generator in the upper crankcase member, and the oil passage and the oil nozzle as occasion demands is formed only in the lower crankcase member, it is possible to simplify manufacturing of the crankcase.

It is preferable for the oil nozzle to have a throttle hole.

In accordance with the structure mentioned above, it is possible to accurately inject the oil in a desired direction and toward a desired subject from the oil nozzle with a proper pressure.

BRIEF DESCRIPTION OF THE DRAWINGS

The above and other objects, features and advantages of the present invention will be become more apparent from the following description taken in connection with the accompanying drawings.

FIG. 6 is a vertical cross sectional view of a prior art arrangement.

DETAILED DESCRIPTION OF THE PREFERRED EMBODIMENTS

FIGS. 1 to 5 show an example of an engine for a motorcycle to which the present invention is applied, and a description will be given of an embodiment in accordance with the present invention on the basis of these drawings.

Figure 1:
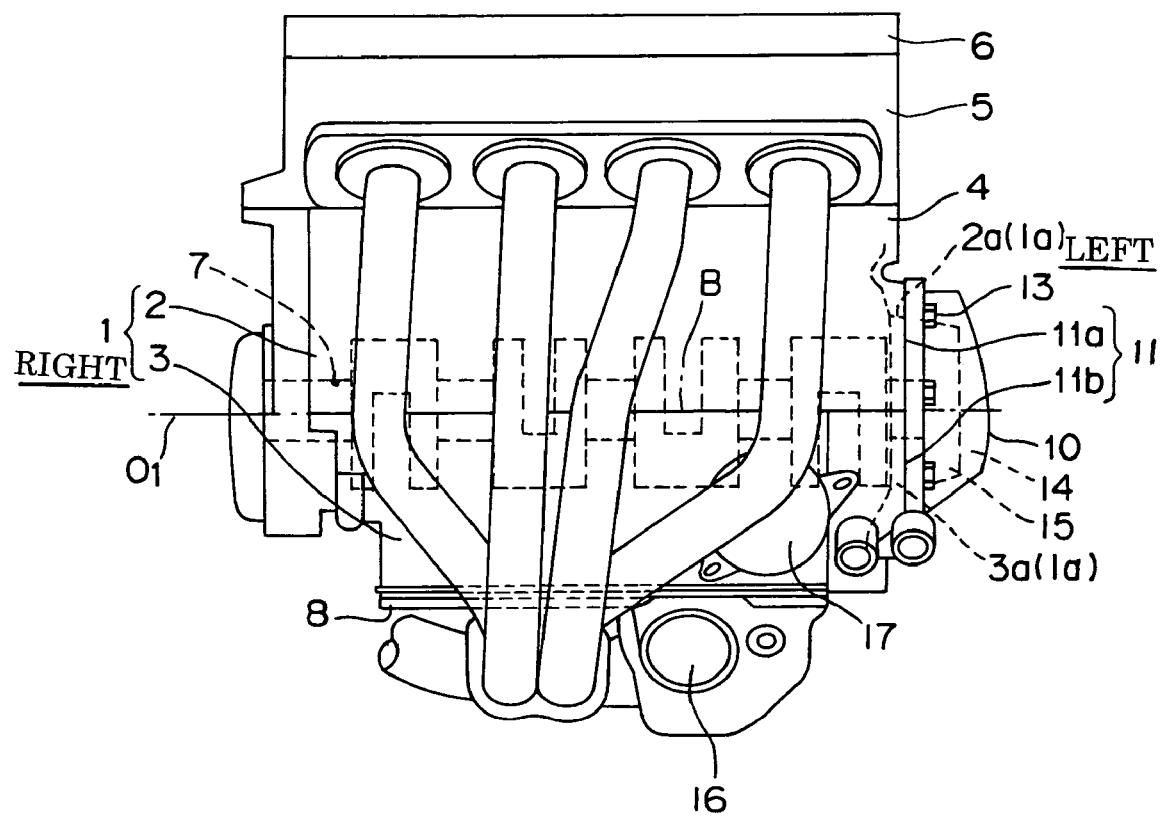
FIG. 1 is a front elevational view of an engine for a motorcycle having a generator cooling system in accordance with an embodiment of the present invention.

FIG. 1 is a front elevational view of the engine. A crankcase 1 is vertically divided into an upper crankcase member 2 and a lower crankcase member 3 by a flat mating face B, a cylinder (a cylinder block) 4 is integrally formed in an upper surface of the upper crankcase member 2, a cylinder head 5 is fastened to an upper surface of the cylinder 4, a head cover 6 is fastened to an upper surface of the cylinder head 5, and an oil pan case 8 is fastened to a lower surface of the lower crankcase member 3.

In the present embodiment, as a matter of convenience of explanation, the following description will be given on the assumption that a direction of an axial length of a crankshaft 7 is set to a lateral direction, and a right side and a left side when viewing the engine from a rear side are respectively set to a right side and a left side of the engine as described in the drawings.

An oil cooler 17 is attached to a left end portion of a front surface of the lower crankcase member 3, an oil filter 16 is attached to a portion near a left end of a front surface of the oil pan case 8, a generator cover 10 is fastened to a generator cover mounting portion 11 (11a and 11b) formed in a left side wall 1a (2a and 3a) of the crankcase 1 by a plurality of bolts 13, and a generator 15 is accommodated in a generator room 14 within the generator cover 10.

Figure 2:
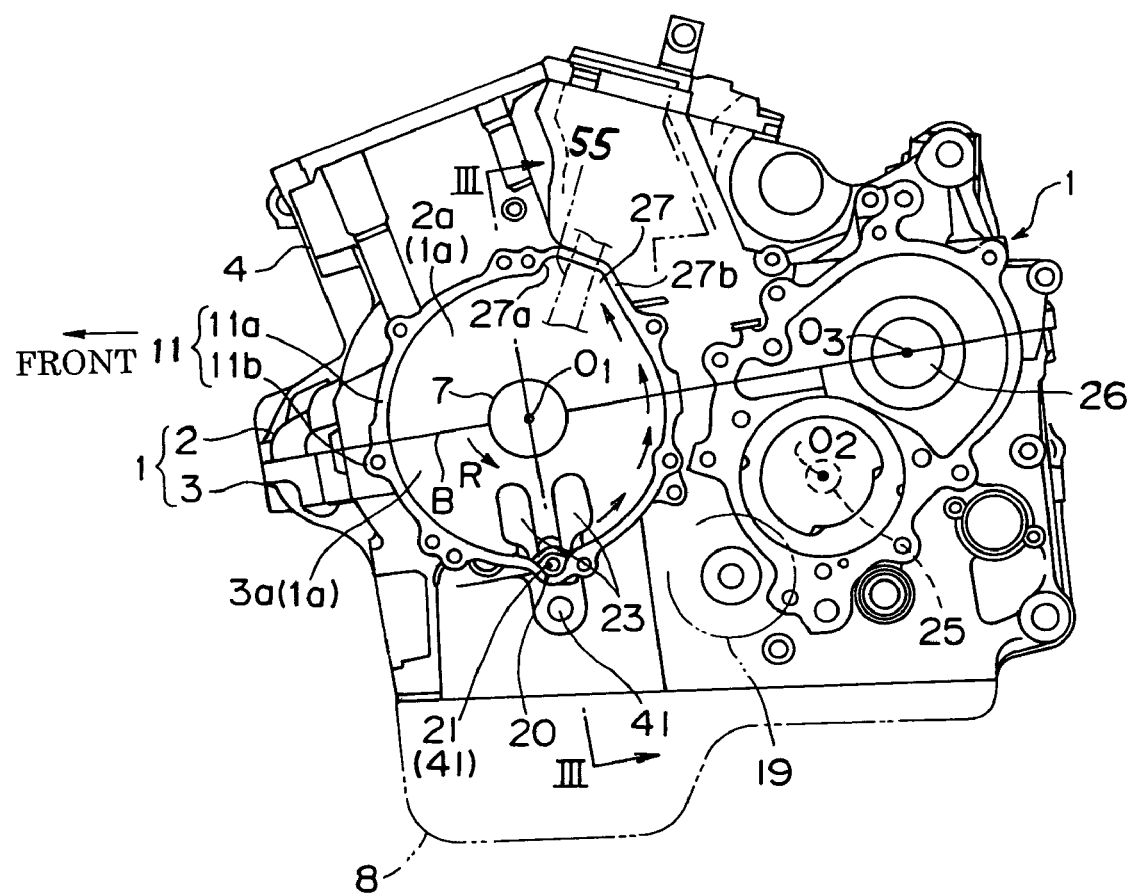
FIG. 2 is a left side elevational view of a crankcase of the engine in FIG. 1.

FIG. 2 is a left side elevational view of the crankcase 1. The mating face B of the crankcase 1 passes through an axis O1 of the crankshaft 7 and an axis O3 of a gear changing output shaft 26 arranged in a rear portion of a transmission chamber of the crankcase 1, a gear changing input shaft 25 is arranged such that an axis O2 of the gear changing input shaft is positioned below the mating face B, and an oil pump 19 is arranged in a front lower end portion of the transmission chamber.

The generator cover mounting portion 11 formed in the left side wall 1a of the crankcase 1 is formed approximately in a circular shape around the axis O1 of the crankshaft 7, a concave portion 20 which is concave downward is formed in a lower end portion of the generator cover mounting portion 11, and an oil nozzle 21 for cooling the generator is formed in the left side wall 1a of the crankcase 1 at a position corresponding to the position of the concave portion 20. A pair of front and rear oil discharge holes 23 communicating an inner side of the generator room 14 with the oil pan case 8 via an inner side of the crank chamber are formed in the left side wall 1a of the crankcase 1 at a position near an upper side of the oil nozzle 21. Further, a concave portion 27 which is concave approximately upward is formed in a portion close to a rear side of an upper end of the generator cover mounting portion 11, an end surface 27a in a crankshaft rotating direction R of the concave portion 27 is bent to an outer side in a radial direction from a circular inner peripheral surface of the generator cover mounting portion 11, and an end surface 27b in a direction opposite the crankshaft rotating direction R of the concave portion 27 extends in a tangential direction with respect to the circular inner peripheral surface of the generator mounting portion 11.

As mentioned above, since the crankcase 1 is constituted by the upper crankcase member 2 and the lower crankcase member 3, the left side wall 1a of the crankcase 1 is properly constituted by the left side wall 2a of the upper crankcase member 2 and the left side wall 3a of the lower crankcase member 3, and the generator cover mounting portion 11 is also constituted by the generator cover mounting portion 11a formed in the upper crankcase member 2 and the generator cover mounting portion 11b formed in the lower crankcase member 3. Accordingly, describing in detail, the lower end concave portion 20 is formed in a lower end portion of the generator cover mounting portion 11b of the lower crankcase member 3, the concave portion 27 near the upper end of the generator cover mounting portion 20 is formed in the generator cover mounting portion 11a of the upper crankcase member 2, and the oil discharge holes 23 are formed in the left side wall 3a of the lower crankcase member 3.

[Structure of Oil Passage]

Figure 3:
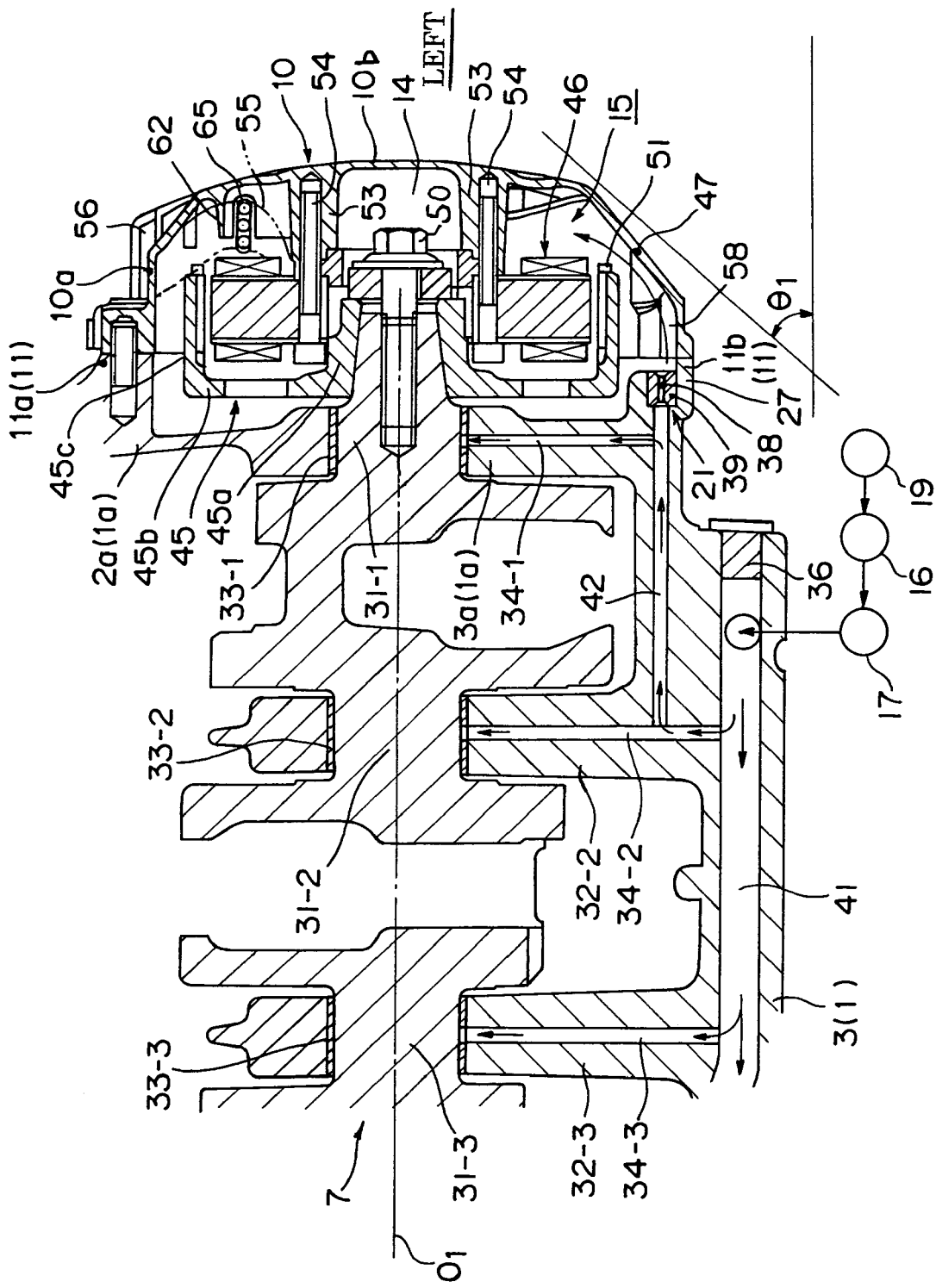
FIG. 3 is an enlarged view of a cross section along a line III-III in FIG. 2.

FIG. 3 is an enlarged view of a cross section along a line III-III in FIG. 2 (a view as seen from a front side). In FIG. 3, the crankshaft 7 has a plurality of journal portions, first, second, third and the like journal portions 31-1, 31-2, 31-3, . . . in this order from the left side while being spaced in the direction of the crank axial. The journal portions 31-1, 31-2, 31-3, . . . are rotatably supported respectively to the left side wall 3a of the lower crankcase member 3 serving as a first journal support wall, and second, third and the like journal support walls 32-2, 32-3, . . . integrally formed with the lower crankcase member 3, via bearing metals 33-1, 33-2, 33-3, . . . , respectively. Vertical oil holes 34-1, 34-2, 34-3, . . . extending in a vertical direction are respectively formed in the left side wall 3a and the respective journal support walls 32-2, 32-3, . . . of the lower crankcase member 3, and upper ends of the vertical oil holes 34-1, 34-2, 34-3, . . . are communicated with the bearing metals 33-1, 33-2, 33-3, . . . of the corresponding journal portions 31-1, 31-2, 31-3, . . . .

In a bottom wall of the lower crankcase member 3, there are formed vertically two stages of main galleries 41 and 42 approximately just below the crankshaft 7, as a main oil passage for supplying the oil to each of the bearing metals 33-1, 33-2, 33-3, . . . of the crankshaft 7. The first main gallery 41 in the lower stage is closed by a plug 36 at a left end of the first main gallery 41, is positioned between the left side wall 3a of the lower crankcase member 3 and the second journal support wall 32-2, and extends rightward to the right side wall of the crankcase 1 approximately in parallel to the crankshaft 7. The lower ends of the vertical oil holes 34-2, 34-3, . . . of the journal support walls 32-2, 32-3, . . . (except the left side wall 3a) are communicated with the portion in the middle of the first main gallery 41. Further, a left end portion of the first main gallery 41 is communicated with a discharge port of the oil pump 19 via the oil cooler 17 and the oil filter 16.

The second main gallery 42 is arranged above the first main gallery 41 in order to enlarge a bank angle θ1 of the motorcycle to which the engine is mounted, is formed so as to have a smaller diameter than the first main gallery 41, extends in parallel to the crankshaft 7 from the second journal support wall 32-2 to the left side wall 3a of the lower crankcase member 3, and is communicated with each of the vertical oil hole 34-2 of the second journal support wall 32-2 and the vertical oil hole 34-1 of the left side wall 3a of the lower crankcase member 3.

The left end of the second main gallery 42 is open toward the left side in the lower end of the generator room 14 as the oil nozzle 21, and a tubular throttle hole forming body 39 having a throttle hole 38 is pressure inserted to the oil nozzle 21.

Figure 5:
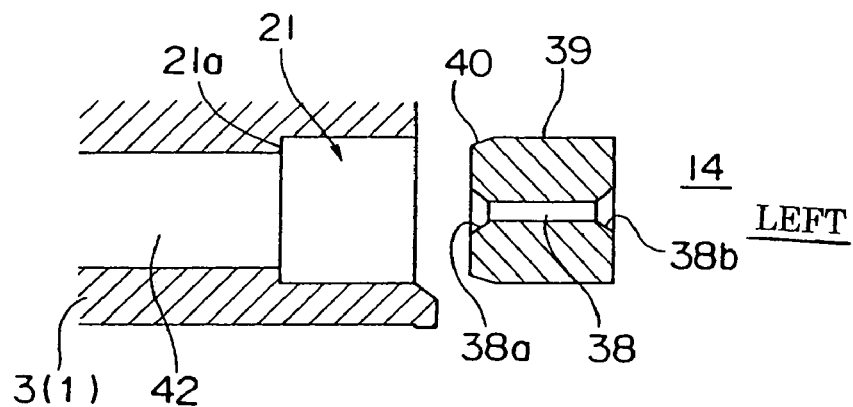
FIG. 5 is an enlarged view of a vertical cross section of an oil nozzle.
Figure 5:
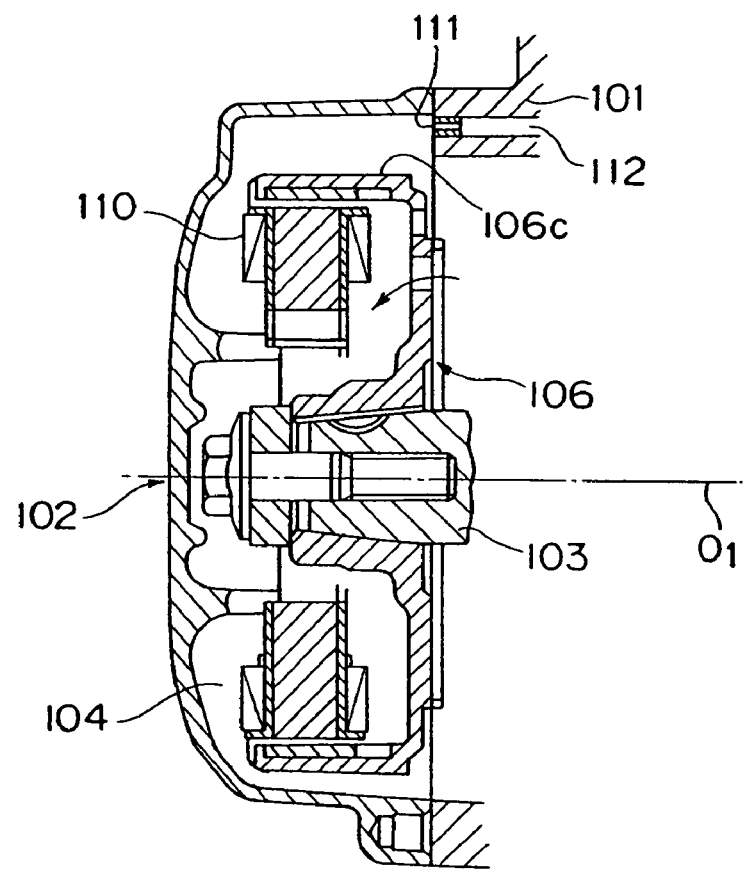

FIG. 5 is an enlarged view of an exploded cross section of the left end portion of the second main gallery 42. The oil nozzle 21 formed in the left end of the second main gallery 42 is enlarged in diameter via an annular step surface 21a, and is structured such that the throttle hole forming body 39 is pressure inserted to an inner peripheral surface of the enlarged oil nozzle 21. In the throttle hole forming body 39, there are formed the throttle hole 38 penetrating in a lateral direction, and chamfered portions 38a and 38b expanded in a cone shape to left and right end portions of the throttle hole 38. Further, a tapered chamfered portion 40 contracted toward a right side is formed in a right end (an end in an insertion side) of an outer peripheral surface of the throttle hole forming body 39.

[Structure of Generator Room and Generator]

In FIG. 3, the crankshaft 7 protrudes to the sealed generator room 14, and the generator 15 is constituted by a rotor 45 fixed to the end portion of the crankshaft 7, and a stator coil 46 fixed to the generator cover 10.

The generator cover 10 is formed in a cup shape by an approximately cylindrical outer peripheral wall 10a surrounding an outer side in a radial direction of the rotor 45, and a side wall 10b covering a left side of the rotor 45, and a guide surface 47 sloping upward to the left is formed in a lower portion of the outer peripheral wall 10a, for enlarging the bank angle θ1 of the motorcycle and for guiding the oil from the oil nozzle 21 to an upper side.

The rotor 45 is formed in a cup shape with a boss 45a fixed to the crankshaft 7 by a bolt 50, a flat portion (a disc portion) 45b perpendicular to the crankshaft 7, and a cylindrical outer peripheral wall 45c extending leftward from an outer peripheral end of the flat portion 45b, and is open toward the side wall 10b of the generator cover 10. A plurality of permanent magnets 51 are fixed to an inner peripheral surface of the cylindrical outer peripheral wall 45c while being spaced uniformly in a peripheral direction.

An inner end portion in a radial direction of the stator coil 46 is fixed to a mounting boss 53 formed in the side wall 10b of the generator cover 10 by a plurality of bolts 54. An outer end of the stator coil 46 faces the permanent magnets 51 of the rotor 45 from an inner side in a radial direction at a distance of an annular gap. A plurality of (for example, three) lead wires 55 connected to the stator coil 46 extend to an upper side of the generator room 14, and are taken out upward from a lead wire taking out concave portion 56 formed near the upper end portion of the generator cover 10.

Figure 4:
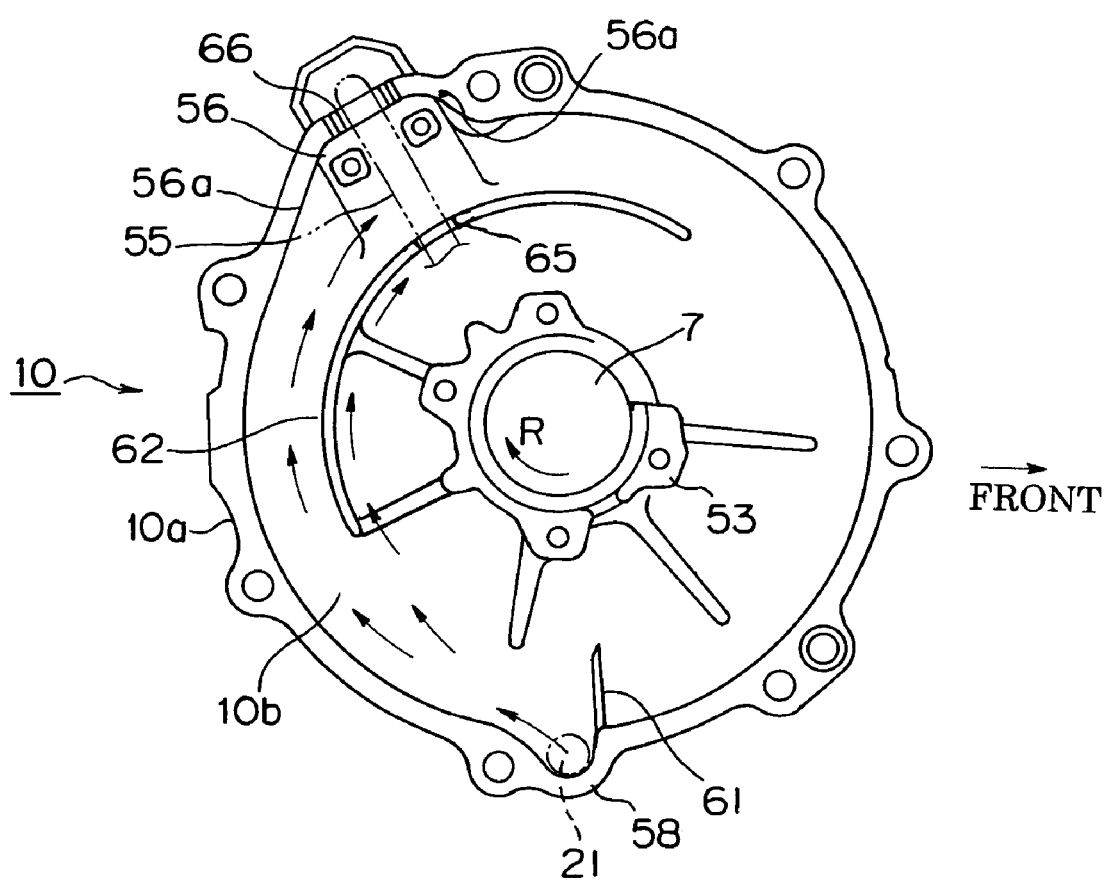
FIG. 4 is an inner face view of a generator cover.

FIG. 4 is a right side elevational view (an inner face view) of the generator cover 10. A concave portion 58 which is concave downward is formed at a position corresponding to a position of the oil nozzle 21 in the lower end portion of the outer peripheral wall 10a, and the concave portion 56 for taking out the lead wire is formed at a position which is a little rearward from the upper end of the outer peripheral wall 10a. Shapes of both the concave portions 58 and 56 respectively correspond to shapes of the concave portions 20 and 27 of the generator cover mounting portion 11 of the crankcase 1 shown in FIG. 2. In other words, in FIG. 4 an end surface 56a in a crankshaft rotating direction R side of the concave portion 56 is bent to an outer side in a radial direction from an inner peripheral surface of a circular shape of the outer peripheral wall 10a. On the other hand, an end surface 56b in an opposite crankshaft rotating direction R side of the concave portion 56 extends in a tangential direction with respect to the inner peripheral surface of the circular shape of the outer peripheral wall 10a.

In a lower end portion of an inner surface in the side wall 10b of the generator cover 10, there is formed a guide rib 61 extending upward from the end portion in the opposite crankshaft rotating direction R side of the lower end concave portion 58, and a semicircular guide rib 62 is formed in an upper half portion of the side wall 10b of the generator cover 10. The semicircular guide rib 62 extends approximately uniformly in the crankshaft rotating direction R and the inverse direction thereto from the corresponding position to the concave portion 56 for taking out the lead wire, and a notch 65 for inserting the lead wire is formed in the guide rib 62 at the position corresponding to the position of the concave portion 56. Further, a hole 66 for taking out the lead wire 55 is formed in an upper wall of the concave portion 56 for taking out the lead wire. An annular rubber seal (not shown) is, for example, fitted to a portion between the notch 65 and the hole 66, and the lead wire 55.

[Operation]

In FIG. 3, the oil discharged from the oil pump 19 arranged below the axis O1 of the crankshaft 7 is first pressure fed to the left end portion of the first main gallery 41 via the oil filter 16 and the oil cooler 17, and is pressure fed to each of the vertical oil holes 34-2, 34-3, . . . within the second and subsequent journal support walls 32-2, 32-3, . . . (i.e., the journal support walls other than the first journal support wall 32-1) from the first main gallery 41, thereby being supplied to each of the bearing metals 33-2, 33-3, . . .

A part of the oil pressure fed to the vertical oil hole 34-2 within the second journal support wall 32-2 is pressure fed to the second main gallery 42, is supplied to the bearing metal 33-1 of the first journal portion 33-1 via the vertical oil hole 34-1 within the left side wall 3a of the lower crankcase member 3 in the middle, reaches the oil nozzle 21 in the left end, and passes through the throttle hole 38, thereby being injected to the lower end portion within the generator room 14 at a proper pressure toward the left side.

The oil injected to the lower end portion within the generator room 14 from the oil nozzle 21 is brought into contact with the slope-shaped guide surface 47 in the lower portion of the generator cover 10 through the lower end concave portion 58 of the generator cover 10, and moves upward along the slope-shaped guide surface 47, thereby being guided to the inner side in the radial direction than the outer peripheral wall 45c of the rotor 45, whirling in the crankshaft rotating direction R along the inner peripheral surface of semicircular guide rib 62 and the inner peripheral surface of the outer peripheral wall 10*a* of generator cover 10 as shown in FIG. 4, and cooling the stator coil 46 (FIG. 3). Particularly, the oil whirling along the inner peripheral surface of the outer peripheral wall 10*a* of the generator cover 10 collides with the end surface 56*a* in the crankshaft rotating direction R of the concave portion 56 for taking out the lead wire in the upper end, is supplied to the lead wire 55 efficiently, and efficiently cools the portion near the lead wire 55 having a great calorific power.

The oil after being utilized for cooling is discharged to the oil pan case 8 via the inner side of the crank chamber from the oil discharge holes 23 in FIG. 2.

Effect of Embodiment (1) As shown in FIG. 3, since the oil nozzle 21 for cooling the generator open to the generator room 14 is formed in the existing second main gallery 42 formed in the lower crankcase member 3 for supplying the oil to the first journal portion 33-1, it is not necessary to newly arrange an oil passage or an oil piping for cooling the generator, and it is possible to simplify the structure of the oil passage.

(2) As shown in FIG. 3, since the oil nozzle 21 is formed below the axis O1 of the crankshaft 7, the pumping height (head) from the oil pump 19 to the oil nozzle 21 becomes lower, it is possible to inject the oil into the generator room 14 at a sufficiently high injection pressure even during low speed operation, and it is possible to prevent a lack of oil. Particularly, since the throttle hole 38 is provided in the oil nozzle 21, it is possible to easily obtain the high injection pressure.

(3) As shown in FIG. 3, since the guide surface 47 guiding the oil injected from the oil nozzle 21 to the inner side in the radial direction than the outer peripheral wall 45*c* of the rotor 45 is formed in the lower portion of the generator cover 10, it is possible to effectively supply the oil to the stator coil 46 within the rotor 45 having the great calorific power, and cooling efficiency is improved.

(4) As shown in FIG. 4, since the guide rib 61 extending to the upper side is formed in the opposite crankshaft rotating direction R side of the lower end concave portion 58 of the generator cover 10 formed at the position corresponding to the position of the oil nozzle 21, it is possible to whirl the oil injected from the oil nozzle 21 in the crankshaft rotating direction R with no waste.

Other Embodiments (1) In the embodiment mentioned above, as shown in FIG. 5, the throttle hole forming body independent from the lower crankcase member is press fitted as the oil nozzle to the second main gallery. However, the throttle hole forming body can be screwed into the second main gallery. Further, the structure may be made such that the throttle hole is directly formed in the crankcase by forming the diameter of the end portion of the second main gallery smaller.

(2) The formed position of the oil nozzle is not limited to the lower end portion of the generator room, but may be appropriately selected in the lower portion of the generator room, that is, in a portion lower than the axis of the crankshaft.

(3) The embodiment mentioned above is applied to the engine provided with the crankcase having the vertically divided structure. However, the present invention is not limited to the engine mentioned above, but can be applied, for example, to an engine provided with a crankcase having a laterally divided structure.

(4) In the embodiment mentioned above, as shown in FIG. 3, the oil nozzle is formed in the end portion of the second main gallery. However, the structure may be made such that the oil nozzle is communicated with the first main gallery via a short oil passage. Further, in the engine provided with only one main gallery, the oil nozzle may be formed in the end portion of the only one main gallery.

(5) The generator in the embodiment mentioned above is structured such that the stator coil is arranged within the cup-shaped rotor. However, the present invention can be applied to an engine provided with a generator in which a stator coil is arranged in an outer side in a radial direction of the rotor.

Although the invention has been described in its preferred embodiments with a certain degree of particularity, obviously many changes and variations are possible therein. It is therefore to be understood that the present invention may be practical otherwise than as specifically described herein without departing from the scope and spirit thereof.

What is claimed is:

1. A generator cooling system of an engine having a generator, including a stator and a rotor, accommodated in a generator room which is formed at an end portion of a crankcase in a longitudinal direction of a crankshaft, said generator cooling system comprising:
an oil passage formed in the crankcase in a position lower than an axis of the crankshaft; and
an oil nozzle provided in the crankcase and in said oil passage for injecting oil of the oil passage toward a lower portion within the generator room;
wherein said oil nozzle is positioned at a lower end portion of the generator room and is configured to inject oil from said oil passage toward a space between a lower end portion of the rotor and a lower end portion of the generator room.

2. The generator cooling system of the engine according to claim 1, wherein the generator is provided with a rotor firmly attached to an end portion of the crankshaft, and a stator coil arranged in an inner side of the rotor in a radial direction of the rotor and firmly attached to a generator cover covering the generator room, the oil nozzle is positioned in an outer side of the rotor in the radial direction, and a guide surface guiding the oil injected from the oil nozzle to the inner side of the rotor in the radial direction is formed in the generator cover.

3. The generator cooling system of the engine according to claim 2, wherein the crankcase is vertically divided into an upper crankcase member and a lower crankcase member, and the oil passage and the oil nozzle are formed in the lower crankcase member.

4. The generator cooling system of the engine according to claim 3, wherein the oil nozzle has a throttle hole.

5. The generator cooling system of the engine according to claim 4, wherein a throttle hole forming body independent from the crankcase is attached to the oil nozzle.

6. A generator cooling system of an engine having a generator accommodated in a generator room which is formed at an end portion of a crankcase in a longitudinal direction of a crankshaft, said generator cooling system comprising:
an oil passage formed to the crankcase in a position lower than an axis of the crankshaft; and
an oil nozzle provided in said oil passage for injecting oil of the oil passage toward a lower portion within the generator room;
wherein said oil nozzle is positioned at a lower end portion of the generator room; and wherein the generator is provided with a rotor firmly attached to an end portion of the crankshaft, and a stator coil arranged in an inner side of the rotor in a radial direction of the rotor and firmly attached to a generator cover covering the generator room, the oil nozzle is positioned in an outer side of the rotor in the radial direction, and a guide surface guiding the oil injected from the oil nozzle to the inner side of the rotor in the radial direction is formed in the generator cover.

7. The generator cooling system of the engine according to claim 6, wherein the crankcase is vertically divided into an upper crankcase member and a lower crankcase member, and the oil passage and the oil nozzle are formed in the lower crankcase member.

8. The generator cooling system of the engine according to claim 7, wherein the oil nozzle has a throttle hole.

9. The generator cooling system of the engine according to claim 8, wherein a throttle hole forming body independent from the crankcase is attached to the oil nozzle.

* * * * *